US009776157B2

(12) United States Patent
Morita et al.

(10) Patent No.: US 9,776,157 B2
(45) Date of Patent: Oct. 3, 2017

(54) THERMALLY EXPANDABLE MICROCAPSULE, METHOD FOR PRODUCING THERMALLY EXPANDABLE MICROCAPSULE, FOAMABLE MASTERBATCH, AND FOAM MOLDED ARTICLE

(75) Inventors: Hiroyuki Morita, Osaka (JP); Hiroshi Yamauchi, Osaka (JP); Hiroshi Natsui, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 778 days.

(21) Appl. No.: 13/637,216

(22) PCT Filed: Mar. 3, 2011

(86) PCT No.: PCT/JP2011/054885
§ 371 (c)(1),
(2), (4) Date: Nov. 27, 2012

(87) PCT Pub. No.: WO2011/122229
PCT Pub. Date: Oct. 6, 2011

(65) Prior Publication Data
US 2013/0065976 A1    Mar. 14, 2013

(30) Foreign Application Priority Data
Mar. 31, 2010    (JP) .................................. 2010-83511

(51) Int. Cl.
| C08L 33/08 | (2006.01) |
| C08J 9/16 | (2006.01) |
| C08L 33/26 | (2006.01) |
| C08L 33/02 | (2006.01) |
| C08L 33/10 | (2006.01) |
| C08L 33/20 | (2006.01) |
| B01J 13/14 | (2006.01) |
| C08F 220/44 | (2006.01) |
| C08F 220/56 | (2006.01) |

(52) U.S. Cl.
CPC ............. B01J 13/14 (2013.01); C08F 220/44 (2013.01); C08F 220/56 (2013.01)

(58) Field of Classification Search
None
See application file for complete search history.

(56) References Cited

U.S. PATENT DOCUMENTS

| 6,235,394 B1 * | 5/2001 | Shimazawa et al. .... 428/402.21 |
| 6,235,800 B1 | 5/2001 | Kyuno et al. |
| 2004/0157057 A1 | 8/2004 | Tasaki et al. |
| 2005/0026067 A1 | 2/2005 | Masuda et al. |
| 2009/0149559 A1 * | 6/2009 | Masuda .................. B01J 13/14 521/56 |
| 2009/0292031 A1 | 11/2009 | Ejiri |
| 2010/0016486 A1 * | 1/2010 | Oono et al. ................... 524/314 |

FOREIGN PATENT DOCUMENTS

| CN | 101378831 | 3/2009 | |
| EP | 1 508 604 | 2/2005 | |
| EP | 1 577 359 | 9/2005 | |
| JP | 62-286534 | 12/1987 | |
| JP | 2002-363537 | 12/2002 | |
| JP | 2005-36145 | 2/2005 | |
| JP | 2006-002134 | 1/2006 | |
| JP | WO 2007058379 A1 * | 5/2007 | ............. B01J 13/14 |
| JP | 2009-526117 | 7/2009 | |
| JP | 2009-526118 | 7/2009 | |
| JP | 2009-221429 | 10/2009 | |
| JP | 2009-540047 | 11/2009 | |
| WO | 99/43758 | 9/1999 | |
| WO | 99/46320 | 9/1999 | |
| WO | 03/099955 | 12/2003 | |
| WO | 2007/072769 | 6/2007 | |
| WO | 2007/091960 | 8/2007 | |
| WO | 2007/091961 | 8/2007 | |
| WO | 2007/142593 | 12/2007 | |

OTHER PUBLICATIONS

International Search Report dated Jun. 7, 2011 in International (PCT) Application No. PCT/JP2011/054885.
Extended European Search Report dated Jul. 24, 2015 in corresponding European Application No. 11762469.2.

* cited by examiner

Primary Examiner — Jeffrey Washville
(74) Attorney, Agent, or Firm — Wenderoth, Lind & Ponack, L.L.P.

(57) ABSTRACT

The present invention provides a thermally expandable microcapsule that is excellent in heat resistance and durability and exhibits an excellent foaming property in a wide temperature range from low temperatures to high temperatures. The present invention is a thermally expandable microcapsule, which comprises a shell containing a copolymer, and a volatile liquid as a core agent included in the shell, the copolymer being obtainable by polymerization of a monomer mixture containing a monomer A and a monomer B, the monomer A being at least one selected from the group consisting of a nitrile group-containing acrylic monomer and an amide group-containing acrylic monomer, the monomer B being at least one selected from the group consisting of a carboxyl group-containing acrylic monomer and an ester group-containing acrylic monomer, a total amount of the monomer A and the monomer B accounting for 70% by weight or more of the monomer mixture, and a weight ratio of the monomer A and the monomer B being 5:5 to 9:1.

8 Claims, No Drawings

180
THERMALLY EXPANDABLE MICROCAPSULE, METHOD FOR PRODUCING THERMALLY EXPANDABLE MICROCAPSULE, FOAMABLE MASTERBATCH, AND FOAM MOLDED ARTICLE

This application is a U.S. national stage of International Application No. PCT/JP2011/054885 filed Mar. 3, 2011.

TECHNICAL FIELD

The present invention relates to a thermally expandable microcapsule that is excellent in heat resistance and durability and exhibits an excellent foaming property in a wide temperature range from low temperatures to high temperatures. The present invention also relates to a method for producing the thermally expandable microcapsule, and a foamable masterbatch and a foam molded article which are produced from the thermally expandable microcapsule.

BACKGROUND ART

Plastic foams are used for various applications because, in accordance with the materials and the foamed state of the plastic foams, various functions such as heat insulation, heat shielding, sound insulation, sound absorption, vibration proof, vibration damping, and weight saving can be expressed. An exemplary method for producing plastic foams include the steps of: molding a resin composition containing a foaming agent or foamable masterbatch and a matrix resin (e.g. thermoplastic resin) by a molding method such as injection molding and extrusion molding; and foaming the foaming agent by heat generated in molding.

For production of the plastic foams, thermally expandable microcapsules are used as a foaming agent, which includes thermoplastic shell polymers containing a volatile expansion agent that is gasified at a temperature lower than the softening point of the shell polymers. Such thermally expandable microcapsules are expanded by gasification of the volatile expansion agent and softening of the shell polymers by heating.

Patent Literature 1, for example, discloses a thermally expandable microcapsule having: an outer shell including polymers obtained by polymerization of a monomer mixture that contains a nitrile monomer (I), a monomer (II) having one unsaturated double bond and a carboxyl group in a molecule, a monomer (III) having two or more polymerizable double bonds in a molecule, and, if needed, a monomer (IV) different from and copolymerizable with the monomers (I), (II), and (III); and a foaming agent enclosed in the outer shell.

Patent Literature 1 teaches that the thermally expandable microcapsule disclosed therein stably foams in a high temperature range at a high expansion ratio and the resulting foam can serve as a highly elastic product.

However, conventional thermally expandable microcapsules as disclosed in Patent Literature 1 may have been soon deflated by outgassing of the volatile expansion agent and burst or shrinkage of shell polymers, which indicates such thermally expandable microcapsules are still insufficient in terms of the heat resistance and durability.

Patent Literature 2 discloses a thermally foamable microsphere. In the microsphere, an outer shell containing a foaming agent can be a copolymer having a polymethacrylimide structure, and monomers forming the polymethacrylimide structure by the copolymerization reaction are methacrylonitrile and methacrylic acid.

Patent Literature 2 teaches that the thermally foamable microsphere disclosed therein is excellent in heat resistance and stably foams at a high expansion ratio because the outer shell therein is a copolymer which can form a polymethacrylimide structure.

CITATION LIST

Patent Literature

Patent Literature 1: WO 03/099955
Patent Literature 2: WO 07/072,769

SUMMARY OF INVENTION

Technical Problems

However, though the thermally foamable microsphere disclosed in Patent Literature 2 has improved heat resistance, the foaming property at low temperatures is problematically lowered. Moreover, in the case where the thermally foamable microsphere of Patent Literature 2 is used in a foam molding treatment by a molding method in which a strong shear force is applied, such as kneading molding, calendar molding, extrusion molding, and injection molding, the foaming temperature is problematically lowered so that foam molded articles having a desired expansion ratio are not stably produced.

Patent Literature 2 teaches that the "polymethacrylimide structure" is obtainable by cyclization of a nitrile group and a carboxyl group by heating. However, in Patent Literature 2, the reactivity of monomers in a copolymerization reaction and that in a cyclization reaction are not sufficiently studied. Since application of copolymers which can form a polymethacrylimide structure to a thermally expandable microcapsule has been hardly tried, further investigation of the performance of a thermally expandable microcapsule to which such copolymers are applied may lead to improvement in the heat resistance and the durability of thermally expandable microcapsule.

The present invention aims to provide a thermally expandable microcapsule that is excellent in the heat resistance and the durability and exhibits an excellent foaming property in a wide temperature range from low temperatures to high temperatures. The present invention further aims to provide a method for producing the thermally expandable microcapsule, and a foamable masterbatch and a foam molded article which are produced from the thermally expandable microcapsule.

Solution to Problem

The present invention is a thermally expandable microcapsule, which comprises a shell containing a copolymer, and a volatile liquid as a core agent included in the shell, the copolymer being obtainable by polymerization of a monomer mixture containing a monomer A and a monomer B, the monomer A being at least one selected from the group consisting of a nitrile group-containing acrylic monomer and an amide group-containing acrylic monomer, the monomer B being at least one selected from the group consisting of a carboxyl group-containing acrylic monomer and an ester group-containing acrylic monomer, a total amount of the monomer A and the monomer B accounting for 70% by weight or more of the monomer mixture, and a weight ratio of the monomer A and the monomer B being 5:5 to 9:1.

Hereinafter, the present invention is specifically described.

The present inventors found out that, in a thermally expandable microcapsule having a shell containing a copolymer and a volatile liquid as a core agent included in the shell, use of a combination of predetermined acrylic monomers as main components of monomers constituting the copolymer improves the heat resistance and the durability, and also improves a foaming property in a wide temperature range from low temperatures to high temperatures.

Namely, the present inventors found out that, in the thermally expandable microcapsule having a shell containing a copolymer and a volatile liquid as a core agent included in the shell, use of predetermined amounts of monomers A and B that are each at least one acrylic monomer selected from a predetermined group allows production of a thermally expandable microcapsule that is excellent in the heat resistance and the durability and exhibits an excellent foaming property at a wide temperature range from low temperatures to high temperatures, thereby completing the present invention.

The thermally expandable microcapsule of the present invention includes a volatile liquid as a core agent in a shell containing a copolymer.

Such a configuration allows gasification of the core agent and softening and expansion of the shell by heat generated in molding of the thermally expandable microcapsule of the present invention mixed with a matrix resin, so that a foam molded article is produced.

The copolymer is obtainable by polymerization of a monomer mixture containing a monomer A and a monomer B, wherein the monomer A is at least one selected from the group consisting of a nitrile group-containing acrylic monomer and an amide group-containing acrylic monomer and the monomer B is at least one selected from the group consisting of a carboxyl group-containing acrylic monomer and an ester group-containing acrylic monomer.

The acrylic monomer herein refers to a monomer of an acrylic acid derivative which has an olefinic double bond and is commonly used as a monomer for an acrylic copolymer. The methacrylic monomer herein refers to a monomer of a methacrylic acid derivative which has an olefinic double bond and is commonly used as a monomer for an acrylic copolymer. Accordingly, the acrylic monomer and the methacrylic monomer herein are distinguished from each other. The term "(meth)acryl" herein may refer to "acryl", "methacryl", or both "acryl" and "methacryl".

In the case where the thermally expandable microcapsule of the present invention is used in foam molding, use of the monomer mixture promotes a cyclization reaction between the functional groups contained in the monomer A and in the monomer B by heat generated in molding, so that the copolymer can form a polyacrylimide structure. Here, the cyclization reaction between the functional groups contained in the monomer A and in the monomer B refers to a cyclization reaction between a nitrile group and a carboxyl group, a cyclization reaction between a nitrile group and an ester group, a cyclization reaction between an amide group and a carboxyl group, and a cyclization reaction between an amide group and an ester group.

Use of the monomer mixture allows the thermally expandable microcapsule of the present invention to be excellent in the heat resistance and the durability and to exhibit an excellent foaming property in a wide temperature range from low temperatures to high temperatures. The reason for this is presumably that the copolymer is likely to form a polyacrylimide structure owing to high reactivity of the monomers A and B in the copolymerization reaction and high reactivity of functional groups contained in the monomers A and B in the cyclization reaction. One reason why the thermally expandable microcapsule of the present invention exhibits an excellent foaming property at low temperatures is that components for raising the glass transition temperature of the copolymer, such as methacrylic acid, are not essentially contained.

Moreover, use of the monomer mixture does not lower the foaming temperature of the thermally expandable microcapsule of the present invention, even when the microcapsule is used in foam molding by a molding method in which a strong shear force is applied, such as kneading molding, calendar molding, extrusion molding, and injection molding. As a result, foam molded articles having a desired expansion ratio are stably produced.

The monomer A is not particularly limited as long as it is at least one selected from the group consisting of a nitrile group-containing acrylic monomer and an amide group-containing acrylic monomer.

For example, use of the nitrile group-containing acrylic monomer as the monomer A provides improvement in the heat resistance and the gas barrier property of an obtainable thermally expandable microcapsule. For another example, use of not the nitrile group-containing acrylic monomer but the amide group-containing acrylic monomer as the monomer A does not allow an obtainable thermally expandable microcapsule to contain a nitrile group even when a residual monomer is present, so that the thermally expandable microcapsule is excellent in safety and less likely to have an environmental influence.

The nitrile group-containing acrylic monomer is not particularly limited, and examples thereof include acrylonitrile, α-chloroacrylonitrile, α-ethoxyacrylonitrile and fumaronitrile. In particular, acrylonitrile is preferable. Each of these nitrile group-containing acrylic monomers may be used alone, or two or more of them may be used in combination.

The amide group-containing acrylic monomer is not particularly limited, and examples thereof include acrylamide an N-substituted acrylamide, and an N,N-substituted acrylamide. Each of these amide group-containing acrylic monomers may be used alone, or two or more of these may be used in combination.

The N-substituted acrylamide is not particularly limited, and examples thereof include N-isopropylacrylamide, N-methylolacrylamide, N-methoxymethylacrylamide, N-ethoxymethylacrylamide, N-propoxymethylacrylamide, N-isopropoxymethylacrylamide, N-butoxymethylacrylamide, N-isobutoxymethylacrylamide, diacetone acrylamide, and N,N-dimethylaminopropylacrylamide. In particular, N-methoxymethylacrylamide is preferable. Each of these N-substituted acrylamides may be used alone, or two or more of these may be used in combination.

The N,N-substituted acrylamide is not particularly limited, and examples thereof include N,N-dimethylacrylamide, N,N-diethylacrylamide, and acryloylmorpholine. In particular, N,N-dimethylacrylamide is preferable. Each of these N,N-substituted acrylamides may be used alone, or two or more of these may be used in combination.

The monomer B is not particularly limited as long as it is at least one selected from the group consisting of a carboxyl group-containing acrylic monomer and an ester group-containing acrylic monomer.

The carboxyl group-containing acrylic monomer herein includes acrylic monomers containing metal salts of carboxyl groups, in addition to acrylic monomers containing carboxyl groups. The carboxyl group-containing acrylic monomer is not particularly limited, and examples thereof include acrylic acid, maleic acid, itaconic acid, crotonic acid, maleic anhydride, fumaric acid, citraconic acid, and metal salts of these. Examples of the metal salt forms of the monomer include acrylic acid metal salts such as magnesium acrylate, calcium acrylate, and zinc acrylate. In particular, acrylic acid and zinc acrylate are preferable. Each of these carboxyl group-containing acrylic monomers may be used alone, or two or more of these may be used in combination.

The ester group-containing acrylic monomer is not particularly limited, and examples thereof include alkyl acrylate esters. Each of these ester group-containing acrylic monomers may be used alone, or two or more of these may be used in combination.

In the case where an alkyl acrylate ester is used as the monomer B, the ester group of the alkyl acrylate ester in the thermally expandable microcapsule of the present invention used for foam molding is decomposed by heat generated in molding and generates a carboxyl group and a hydrocarbon. Such a carboxyl group can form a polyacrylimide structure by a reaction with a nitrile group or amide group and the hydrocarbon functions to assist the core agent to improve the expansion ratio of the thermally expandable microcapsule. Accordingly, use of the alkyl acrylate ester as the monomer B may possibly realize a high expansion ratio even when the core agent is not used.

The alkyl acrylate ester is not particularly limited, and examples thereof include t-butyl acrylate, isobutyl acrylate, methyl acrylate, and ethyl acrylate. In particular, t-butyl acrylate is preferable because it is easily decomposed to acrylic acid by heat. Each of these alkyl acrylate esters may be used alone, or two or more of these may be used in combination.

A combination of the monomer A and the monomer B is not particularly limited. Because of high reactivity in the cyclization reaction, the monomer A is preferably acrylonitrile or acrylamide and the monomer B is preferably acrylic acid or t-butyl acrylate.

The total amount of the monomers A and B accounts for 70% by weight or more of the monomer mixture. If the total amount of the monomers A and B is less than 70% by weight, the number of polyacrylimide structures in the obtained copolymer is not enough. As a result, the obtained thermally expandable microcapsule has the lowered heat resistance and the lowered durability, and hardly exhibits an excellent foaming property in a wide temperature range from low temperatures to high temperatures.

The lower limit of the total amount of the monomers A and B is preferably 80% by weight and more preferably 90% by weight of the monomer mixture.

The weight ratio of the monomer A and the monomer B is 5:5 to 9:1. If the weight ratio is out of the above range, the number of polyacrylimide structures in the obtained copolymer is not enough. As a result, the obtained thermally expandable microcapsule has the lowered heat resistance and the durability, and hardly exhibits an excellent foaming property in a wide temperature range from low temperatures to high temperatures. If the amount of the monomer B is larger than the above range, the monomer mixture has a too-high polarity. In such a case, when the monomer mixture is dispersed in an aqueous dispersion medium to be polymerized as described below, it cannot form stable droplets by emulsification so that a microcapsule structure cannot be obtained.

In the monomer mixture, the weight ratio of the monomers A and B is preferably 6:4 to 9:1 and more preferably 7:3 to 9:1.

In the case where the monomer mixture contains other monomer(s) other than the monomers A and B (hereinafter, also simply referred to as other monomer(s)), the other monomer(s) is/are not particularly limited and may be appropriately determined in accordance with the properties required of the resulting thermally expandable microcapsule. The other monomer(s) may be acrylic or methacrylic monomers.

Examples of the other monomers include methacrylonitrile, methacrylamide, methacrylic acid, t-butyl methacrylate, vinyl acetate, styrene, and vinylidene chloride.

Polymerization of the above monomer mixture provides a copolymer constituting the shell of the thermally expandable microcapsule of the present invention.

A polymerization initiator used for polymerization of the monomer mixture is not particularly limited, and examples thereof include dialkyl peroxides, diacyl peroxides, peroxy esters, peroxydicarbonates, and azo compounds. Each of these polymerization initiators may be used alone, or two or more of these may be used in combination.

The dialkyl peroxides are not particularly limited, and examples thereof include methylethyl peroxide, di-t-butyl peroxide, dicumyl peroxide, and isobutyl peroxide.

The diacyl peroxides are not particularly limited, and examples thereof include benzoyl peroxide, 2,4-dichloro benzoyl peroxide, and 3,5,5-trimethyl hexanoyl peroxide.

The peroxy esters are not particularly limited, and examples thereof include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and (α,α-bis-neodecanoyl peroxy)diisopropyl benzene.

The peroxydicarbonates are not particularly limited, and examples thereof include bis(4-t-butylcyclohexyl)peroxydicarbonate, di-n-propyl-peroxydicarbonate, diisopropyl peroxydicarbonate, di(2-ethylethylperoxy)dicarbonate, dimethoxybutyl peroxydicarbonate, and di(3-methyl-3-methoxybutylperoxy)dicarbonate.

The azo compounds are not particularly limited, and examples thereof include 2,2'-azobisisobutyronitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

The amount of the polymerization initiator is not particularly limited, and the lower limit thereof is preferably 0.1 parts by weight and the upper limit thereof is preferably 5 parts by weight for 100 parts by weight of the monomer mixture. If the amount of the polymerization initiator is less than 0.1 parts by weight, the polymerization reaction of the monomer mixture does not progress sufficiently, so that the thermally expandable microcapsule excellent in the heat resistance and the durability cannot be obtained. If the amount of the polymerization initiator is more than 5 parts by weight, the polymerization reaction of the monomer mixture is rapidly initiated. This may cause occurrence of coagulation or a runaway reaction that brings safety issues.

The weight average molecular weight of the copolymer is not particularly limited, and the lower limit thereof is preferably 0.1 million and the upper limit thereof is preferably 10 million, more preferably 3 million. If the weight average molecular weight is less than 0.1 million, the resulting thermally expandable microcapsule may have a shell with lowered strength, so that the heat resistance and the durability thereof may be lowered. If the weight average molecular weight is more than 10 million, the resulting thermally expandable microcapsule may have a shell with extreme strength, so that the foaming property may be lowered.

The shell may contain a metal cation.

The metal cation included in the shell forms ionic crosslinks with the carboxyl group derived from the carboxyl group-containing acrylic monomer, for example, and a crosslinking efficiency of the shell is improved to enhance the heat resistance.

Moreover, owing to the formation of the ionic crosslinks, the elasticity of the shell in the resulting thermally expandable microcapsule is less likely to be lowered even at high temperatures. Such a thermally expandable microcapsule in which the elasticity of the shell is less likely to be lowered even at high temperatures can foam at a high expansion ratio even in the case of being used in form molding by a molding method in which a strong shear force is applied, such as kneading molding, calendar molding, extrusion molding, and injection molding.

The metal cation is not particularly limited as long as it is a metal cation capable of forming ionic crosslinks with a carboxyl group derived from the carboxyl group-containing acrylic monomer. Examples thereof include ions of elements such as Na, K, Li, Zn, Mg, Ca, Ba, Sr, Mn, Al, Ti, Ru, Fe, Ni, Cu, Cs, Sn, Cr, and Pb. Preferable among these are ions of Ca, Zn, and Al which are divalent or trivalent metal cations. Particularly preferable is Zn ion.

The metal cation is preferably added in a form of a metal cation hydroxide at the time of production of the thermally expandable microcapsule. Each of these metal cations may be used alone, or two or more of these may be used in combination.

In the case where two or more of the metal cations are used in combination, it is preferable to use an ion of an alkaline metal or alkaline earth metal, and a metal cation other than the alkaline metal or alkaline earth metal ion in combination. The alkaline metal or alkaline earth metal ion can activate functional groups such as a carboxyl group to promote ionic crosslinking between the functional group such as a carboxyl group and the metal cation other than the alkaline metal or alkaline earth metal ion.

The alkaline metal or alkaline earth metal is not particularly limited, and examples thereof include Na, K, Li, Ca, Ba, and Sr. Preferable among these are Na and K which are strongly basic materials.

In the case where the shell contains the metal cation, the amount of the metal cation in the shell is not particularly limited. The lower limit thereof is preferably 0.1% by weight and the upper limit thereof is preferably 5.0% by weight. If the amount of the metal cation is less than 0.1% by weight, an effect of improving the heat resistance of the resulting thermally expandable microcapsule may not be obtained sufficiently. If the amount of the metal cation is more than 5.0% by weight, the resulting thermally expandable microcapsule may not foam at a high expansion ratio.

If necessary, the shell may contain a stabilizer, an ultraviolet absorber, an antioxidant, an antistatic agent, a flame retardant, a silane coupling agent, a coloring agent, and the like.

The volatile liquid is not particularly limited, and a low-boiling organic solvent is preferably used. Specific examples thereof include: low molecular weight hydrocarbons such as ethane, ethylene, propane, propene, n-butane, isobutene, butene, isobutene, n-pentane, isopentane, neopentane, n-hexane, heptane, isooctane, nonane, decane, cyclohexane, and petroleum ether; chlorofluorocarbons such as $CCl_3F$, $CCl_2F_2$, $CClF_3$, and $CClF_2$—$CClF_2$; and tetraalkylsilanes such as tetramethylsilane, trimethylethylsilane, trimethylisopropylesilane, trimethyl-n-propylsilane. In particular, isobutene, n-butane, n-pentane, isopentane, n-hexane, and petroleum ether are preferable as the resulting thermally expandable microcapsule foams rapidly and at a high expansion ratio. Each of these volatile liquids may be used alone, or two or more of these may be used in combination.

Moreover, a pyrolytic compound that is pyrolyzed to produce gas may be used as the volatile liquid.

The amount of the volatile liquid is not particularly limited, and the lower limit thereof is preferably 10% by weight and the upper limit thereof is preferably 25% by weight of the thermally expandable microcapsule of the present invention. If the amount is less than 10% by weight, the resulting thermally expandable microcapsule may have a too-thick shell so as not to foam unless the temperature is high. If the amount is more than 25% by weight, the resulting thermally expandable microcapsule may have a shell with lowered strength, failing to foam at a high expansion ratio.

The maximum foaming temperature (Tmax) of the thermally expandable microcapsule of the present invention is not particularly limited. The lower limit thereof is preferably 190° C. If the maximum foaming temperature (Tmax) is lower than 190° C., the thermally expandable microcapsule may have lowered heat resistance. In such a case, at high temperatures, the thermally expandable microcapsule may fail to foam at a high expansion ratio. In addition, if the maximum foaming temperature (Tmax) is lower than 190° C., in the case where a masterbatch pellet is produced from the thermally expandable microcapsule, for example, a shear force during the production of the pellet may problematically cause foaming, failing to stably produce an unfoamed masterbatch pellet. The lower limit of the maximum foaming temperature of the thermally expandable microcapsule is more preferably 200° C.

The maximum foaming temperature (Tmax) herein refers to a temperature at which the change of the diameter of the thermally expandable microcapsule reaches the maximum value in measurement of the thermally expandable microcapsule with heating from ambient temperature.

In the present invention, the foaming starting temperature (Ts) of the thermally expandable microcapsule standing still and the foaming starting temperature (Tsd) of thermally expandable microcapsule with a shear force applied thereto preferably have a difference (ΔTs=Ts−Tsd) of lower than 30° C. If the ΔTs is not lower than 30° C., the thermally expandable microcapsule used in the foam molding may foam unstably because of the strength of the shear force. As a result, foam molded articles having a desired expansion ratio may not be stably produced.

The volume average particle size of the thermally expandable microcapsule of the present invention is not particularly limited. The lower limit is preferably 10 μm and the upper limit is preferably 50 μm. If the volume average particle size is less than 10 μm, for example, in the case where the thermally expandable microcapsule is used in the foam molding, cells in the resulting foam molded article may be possibly too small, so that the weight saving is insufficient. If the volume average particle size is more than 50 μm, for example, in the case where the thermally expandable microcapsule is used in the foam molding, cells in an obtainable foam molded article may be too big, so that such an article has a problem in terms of the strength. The lower limit of the volume average particle size is more preferably 15 μm and the upper limit is more preferably 40 μm.

As mentioned above, the thermally expandable microcapsule of the present invention is excellent in reactivity of the monomer A and the monomer B in the copolymerization reaction and the reactivity of functional groups contained in the monomers A and B in the cyclization reaction, so that the copolymer is likely to form a polyacrylimide structure. Therefore, the thermally expandable microcapsule is excellent in the heat resistance and the durability and exhibits an excellent foaming property in a wide temperature range from low temperatures to high temperatures.

In the case where the nitrile group-containing acrylic monomer is not used and only the amide group-containing acrylic monomer is used as the monomer A, the thermally expandable microcapsule of the present invention is excellent in safety and less likely to have an environmental influence.

Moreover, in the case where the alkyl acrylate ester is used as the monomer B, the thermally expandable microcapsule of the present invention can foam at a high expansion ratio, possibly realizing a high expansion ratio even when the core agent is not used.

A method for producing the thermally expandable microcapsule of the present invention is not particularly limited as long as it has a step of polymerizing the monomer mixture. The method for producing the thermally expandable microcapsule of the present invention is another aspect of the present invention.

An exemplary method for producing the thermally expandable microcapsule of the present invention preferably has the steps of: preparing an aqueous dispersion medium; dispersing an oily mixture containing the monomer mixture and the volatile liquid in the aqueous dispersion medium; and polymerizing the monomer mixture.

In the step of preparing an aqueous dispersion medium, for example, a polymerization reaction vessel is charged with water, a dispersion stabilizer, and an auxiliary stabilizer, if needed, so that an aqueous dispersion medium is prepared.

The dispersion stabilizer is not particularly limited, and examples thereof include silica such as colloidal silica, calcium phosphate, magnesium hydroxide, aluminum hydroxide, ferric hydroxide, barium sulfate, calcium sulfate, sodium sulfate, calcium oxalate, calcium carbonate, barium carbonate, and magnesium carbonate.

The amount of the dispersion stabilizer is not particularly limited, and may be appropriately determined in accordance with the average particle size of a target thermally expandable microcapsule.

In the case where colloidal silica is used as the dispersion stabilizer, for example, the lower limit of the amount of the dispersion stabilizer is preferably 1 part by weight and the upper limit is preferably 20 parts by weight for 100 parts by weight of all the monomer components in the monomer mixture. If the amount is less than 1 part by weight, the effect of the dispersion stabilizer is not sufficiently obtained, so that the thermally expandable microcapsule excellent in the heat resistance and the durability cannot be obtained. If the amount is more than 20 parts by weight, the dispersion stabilizer may not be attached to the surface of an oil drop of an oily mixture mentioned below or solid powder of an extra dispersion stabilizer may become a source of coagulation or an abnormal reaction. The lower limit of the amount of the dispersion stabilizer is more preferably 2 parts by weight and the upper limit is more preferably 10 parts by weight for 100 parts by weight of all the monomer components in the monomer mixture.

The auxiliary stabilizer is not particularly limited, and examples thereof include a condensation product of diethanol amine and aliphatic dicarboxylic acid, a condensation product of urea and formaldehyde, a water-soluble nitrogen-containing compound, polyethylene oxide, tetramethylammonium hydroxide, gelatin, methyl cellulose, polyvinyl alcohol, dioctyl sulfosuccinate, sorbitan esters, and various emulsifiers.

The water-soluble nitrogen-containing compound is not particularly limited, and examples thereof include polyvinyl pyrrolidone, polyethyleneimine, polyoxyethylene alkylamine, polyacrylamide, polycationic acrylamide, polyaminesulfone, and polyallyl amine. Moreover, examples thereof further include polydialkylaminoalkyl (meth)acrylates such as polydimethylaminoethyl methacrylate and polydimethylaminoethyl acrylate, and polydialkylaminoalkyl (meth)acrylamides such as polydimethylaminopropyl acrylamide and polydimethylaminopropyl methacrylamide. In particular, polyvinyl pyrrolidone is preferable among these.

In the case where the auxiliary stabilizer is added to the aqueous dispersion medium, the amount of the auxiliary stabilizer is not particularly limited, and may be appropriately determined in accordance with the average particle size of a target thermally expandable microcapsule.

For example, in the case where the condensation product or the water-soluble nitrogen-containing compound is used as the auxiliary stabilizer, the lower limit of the amount of the auxiliary stabilizer is preferably 0.05 parts by weight and the upper limit thereof is preferably 2 parts by weight for 100 parts by weight of all the monomer components in the monomer mixture.

The combination of the dispersion stabilizer and the auxiliary stabilizer is not particularly limited, and examples thereof include a combination of colloidal silica and a condensation product, a combination of colloidal silica and a water-soluble nitrogen-containing compound, and a combination of an emulsifier and one of magnesium hydroxide and calcium phosphate. In particular, the combination of colloidal silica and a condensation product is preferable among these. The condensation product is preferably a condensation product of diethanol amine and aliphatic dicarboxylic acid. Particularly preferable are a condensation product of diethanol amine and adipic acid and a condensation product of diethanol amine and itaconic acid.

The aqueous dispersion medium may further contain inorganic salts such as sodium chloride and sodium sulfate, if needed. Addition of such an inorganic salt provides thermally expandable microcapsules in which the particle shape is more uniform. In the case where the inorganic salt is added to the aqueous dispersion medium, the amount of the inorganic salt is not particularly limited, and the upper limit is preferably 100 parts by weight for 100 parts by weight of all the monomer components in the monomer mixture.

The pH of the aqueous dispersion medium may be appropriately determined in accordance with the kind of the dispersion stabilizer and the auxiliary stabilizer to be used.

In the case where silica such as colloidal silica is used as the dispersion stabilizer, for example, an acid such as hydrochloric acid is added, if needed, to adjust the pH of the aqueous dispersion medium to 3 to 4 and the step of polymerizing the monomer mixture is conducted under acidic conditions. In the case where magnesium hydroxide or calcium phosphate is used as the dispersion stabilizer, the aqueous dispersion medium is alkalified so that the step of polymerizing the monomer mixture is conducted under alkaline conditions.

In the step of dispersing an oily mixture containing the monomer mixture and the volatile liquid in the aqueous dispersion medium, the monomer mixture and the volatile liquid may be individually added to the aqueous dispersion medium so as to prepare the oily mixture in the aqueous dispersion medium. However, they are commonly preliminarily mixed to form an oily mixture before being added to the aqueous dispersion medium. In this case, the oily mixture and the aqueous dispersion medium may be separately prepared in different vessels, and then mixed with stirring in another vessel so that the oily mixture is dispersed in the aqueous dispersion medium. After that, the dispersion may be put into a polymerization reaction vessel.

A polymerization initiator is used to polymerize monomers in the monomer mixture. The polymerization initiator may be preliminarily added to the oily mixture or added after mixing of the aqueous dispersion medium and the oily mixture with stirring in a polymerization reaction vessel.

In the step where an oily mixture containing the monomer mixture and the volatile liquid is dispersed in the aqueous dispersion medium, the oily mixture is dispersed while being emulsified to have a predetermined particle size in the aqueous dispersion medium.

A method of emulsification/dispersion is not particularly limited, and examples thereof include a method of stirring the materials with a homomixer (a homomixer supplied by, for example, Tokushu Kika Kogyo Co., Ltd.) or the like, and a method of introducing the materials into a static dispersion machine such as a line mixer and an element-type static dispersion machine. The static dispersion machine may be individually charged with the aqueous dispersion medium and the oily mixture or charged with the dispersion preliminary prepared by mixing and stirring of the aqueous dispersion medium and the oily mixture.

In the step of polymerizing the monomer mixture, a polymerization method is not particularly limited. Examples thereof include polymerization of the monomer mixture by heating. This provides a thermally expandable microcapsule having a shell containing a copolymer and a volatile liquid included in the shell as a core agent. The obtained thermally expandable microcapsule may be subsequently subjected to dehydration and drying.

A foamable masterbatch containing the thermally expandable microcapsule of the present invention and a thermoplastic resin is, another aspect of the present invention.

The thermoplastic resin is not particularly limited, and a thermoplastic resin commonly used in the foam molding may be used. Specific examples thereof include polyolefin such as low density polyethylene (LDPE) and polypropylene (PP), ethylene-vinyl acetate copolymer (EVA), vinyl chloride, polystyrene, thermoplastic elastomer, and ethylene-methyl methacrylate copolymer (EMMA). In particular, LDPE, EVA, EMMA are preferable because they are easily processed owing to their low melting points. Each of these thermoplastic resins may be used alone, or two or more of these may be used in combination.

In the foamable masterbatch of the present invention, the amount of the thermally expandable microcapsule of the present invention is not particularly limited. The lower limit thereof is preferably 0.5 parts by weight and the upper limit thereof is preferably 20 parts by weight for 100 parts by weight of the thermoplastic resin. If the amount of the thermally expandable microcapsule of the present invention is less than 0.5 parts by weight, in the case where the resulting foamable masterbatch is used, cells in the foam molded article may be possibly too small, so that the weight saving is insufficient. If the amount is more than 20 parts by weight, in the case where the resulting foamable masterbatch is used, cells in an obtainable foam molded article may be too big, so that such an article has a problem in terms of the strength. The lower limit of the amount of the thermally expandable microcapsule of the present invention is more preferably 1 part by weight and the upper limit is more preferably 10 parts by weight for 100 parts by weight of the thermoplastic resin.

A method for producing the foamable masterbatch of the present invention is not particularly limited, and the following method may be exemplified.

First, the thermoplastic resin and various additives according to need are preliminarily kneaded with a same-direction twin-screw extruder. The kneaded mass is heated to a predetermined temperature. Then, the thermally expandable microcapsule of the present invention is added thereto. The resulting mixture is further kneaded and cut into a desired size using a pelletizer so as to be formed into a pellet shape. In this manner, the foamable masterbatch of the present invention is produced.

An exemplary method for producing the foamable masterbatch of the present invention includes the steps of: kneading the thermoplastic resin, and the thermally expandable microcapsule of the present invention with a batch-type kneader; and granulating the kneaded mass by a granulator or pelletizing the mass by an extruder and a pelletizer.

The kneader is not particularly limited as long as kneading is conducted without breaking the thermally expandable microcapsule of the present invention. Examples thereof include a pressure kneader and a Banbury mixer.

Applications of the thermally expandable microcapsule and the foamable masterbatch of the present invention are not particularly limited. For example, the thermally expandable microcapsule or the foamable masterbatch may be added to a matrix resin. The mixture is molded by a molding method such as injection molding and extrusion molding. In this manner, a foam molded article is produced which provides heat insulation, heat shielding, sound insulation, sound absorption, vibration proof, vibration damping, and weight saving.

The thermally expandable microcapsule of the present invention is excellent in the heat resistance and the durability and exhibits an excellent foaming property in a wide temperature range from low temperatures to high temperatures. Therefore, the thermally expandable microcapsule and the foamable masterbatch of the present invention are suitably used in the foam molding that has a heating step at high temperatures, and capable of foam at a high expansion ratio.

A foam molded article is another aspect of the present invention which is obtained by foam molding of a resin composition containing the thermally expandable microcapsule or foamable masterbatch of the present invention and a thermoplastic resin.

The thermoplastic resin is not particularly limited, and the same thermoplastic resin as that used in the foamable masterbatch of the present invention may be used.

The foam molded article of the present invention provides excellent heat insulation, heat shielding, sound insulation, sound absorption, vibration proof, vibration damping, and weight saving. Moreover, the foam molded article of the present invention has a high expansion ratio and closed cells are uniformly formed therein. Accordingly, it is soft and offers excellent tactile impression. Therefore, the foam molded article of the present invention is suitably used for applications of building materials, automobile parts, sole, and damping boards.

Advantageous Effects of Invention

The present invention provides a thermally expandable microcapsule that is excellent in the heat resistance and the durability and exhibits an excellent foaming property in a wide temperature range from low temperatures to high temperatures. Moreover, the present invention also provides a method for producing the thermally expandable microcapsule, and a foamable masterbatch and a foam molded article which are produced from the thermally expandable microcapsule.

DESCRIPTION OF EMBODIMENTS

The present invention is described in more detail with reference to examples in the following. The present invention is not limited only to these examples.

Examples 1 to 16, Comparative Examples 1 to 9

(1. Production of Thermally Expandable Microcapsule)

A polymerization reaction vessel was charged with water (250 parts by weight), and 20% by weight colloidal silica (20 parts by weight, Asahi Denka) and polyvinyl pyrrolidone (0.2 parts by weight, BASF) as dispersion stabilizers so that an aqueous dispersion medium was prepared. To the aqueous dispersion medium, an oily mixture containing monomers (100 parts by weight) at a blending ratio shown in Table 1, 2, or 3, azobisisobutyronitrile (AIBN, 0.8 parts by weight) and 2,2'-azobis(2,4-dimethylvaleronitrile) (ADVN, 0.6 parts by weight) as polymerization initiators, and isopentane (20 parts by weight) and isooctane (10 parts by weight) as volatile liquids were added so that a dispersion liquid was prepared. The dispersion liquid was stirred with a homogenizer and placed in a nitrogen-substituted pressure polymerization vessel. The dispersion liquid was allowed to react for 24 hours at 70° C. while being pressurized (0.5 MPa), so that a reaction product was obtained. The reaction product was filtered and the residue was washed with water. These processes were conducted repeatedly. The resulting matter was dried to give a thermally expandable microcapsule.

(2. Production of Foamable Masterbatch)

Low-density polyethylene (100 parts by weight, "SUNFINE PAK00720", ASAHI KASEI) and a stearic acid (10 parts by weight) as lubricants were mixed with a Banbury mixer (twin screw conical extruder "OSC-30", NAGATA-SEISAKUSYO CO., LTD.). When the temperature of the mixture reached about 100° C., the above thermally expandable microcapsule (100 parts by weight) was added thereto. The mixture was further kneaded for 30 seconds and then extruded and pelletized at the same time. In this manner, a foamable masterbatch was produced.

(3. Production of Foam Molded Article)

A thermoplastic elastomer (100 parts by weight, Hytrel #8752, DuPont) as a molding base, the above foamable masterbatch (2.5 parts by weight), and a color masterbatch (3 parts by weight, TOKYO PRINTING INK MFG. CO., LTD.) as a colorant were extrusion-molded by an extruder ("USV30-20", Union Plastic Public Co., Ltd.) to give a foam molded article.

(Evaluation 1)

The thermally expandable microcapsules of examples and comparative examples were each evaluated as follows. Tables 1, 2, and 3 show the results. In addition, Tables 1, 2, and 3 show the nitrile group-containing monomer content (nitrile ratio) (% by weight) in the used monomers in the examples and the comparative examples.

(1) Heat Resistance, Expansion Ratio, Durability, and Shear Strength of Thermally Expandable Microcapsule The resulting thermally expandable microcapsules were each heated from ambient temperature to 280° C. at a rate of 5° C./min with use of a heat foaming stage microscope (JAPAN HIGH TECH CO., LTD.). From any five images of the thermally expandable microcapsule, change of the average particle size was measured each time the temperature rises by 5° C. The maximum foaming temperature (Tmax) (° C.) was measured and the heat resistance was evaluated based on the following criteria.

X: The maximum foaming temperature (Tmax) was lower than 185° C.

Δ: The maximum foaming temperature (Tmax) was not lower than 185° C. and lower than 190° C.

◯: The maximum foaming temperature (Tmax) was not lower than 190° C. and lower than 200° C.

◯◯: The maximum foaming temperature (Tmax) was not lower than 200° C.

The ratio of the average particle size of the thermally expandable microcapsule at the maximum foaming temperature (Tmax) to that at 30° C. herein was the expansion ratio at the maximum foaming temperature (Tmax).

X: The expansion ratio at the maximum foaming temperature (Tmax) was less than 3.0 times.

Δ: The expansion ratio at the maximum foaming temperature (Tmax) was not less than 3.0 times and less than 4.0 times.

◯: The expansion ratio at the maximum foaming temperature (Tmax) was not less than 4.0 times and less than 5.0 times.

◯◯: The expansion ratio at the maximum foaming temperature (Tmax) was not less than 5.0 times.

The durability was evaluated by measuring ΔT½ that is herein a temperature width (half width) in which the expansion ratio is not lower than the half of the ratio at the maximum foaming temperature (Tmax) based on the following criteria.

X: ΔT½ was narrower than 30° C.

Δ: ΔT½ was not narrower than 30° C. and narrower than 40° C.,

◯: ΔT½ was not narrower than 40° C. and narrower than 50° C.

◯◯ T½ was not narrower than 50° C.

The temperature at which foaming started herein was a foaming starting temperature (Ts) in static conditions. The temperature at which foaming started in the case where a stage of the above-mentioned heat foaming stage microscope was rotated during the heating was a foaming starting temperature (Tsd) in shear conditions. A difference (ΔTs=Ts−Tsd) between the foaming starting temperature (Ts) in static conditions and the foaming starting temperature (Tsd) in shear conditions was obtained and the shear strength was evaluated based on the following criteria.

X: ΔTs was not less than 20° C.

◯: ΔTs was less than 20° C.

TABLE 1

| | Monomer | | Parts by weight | Total amount of A and B (% by weight) | A:B | Heat resistance Tmax (° C.) | Evaluation | Expansion ratio Expansion ratio (times) | Evaluation | Durability ΔT½ (° C.) | Evaluation | Shear strength ΔTs (° C.) | Evaluation | Nitrile ratio |
|---|---|---|---|---|---|---|---|---|---|---|---|---|---|---|
| Example 1 | Monomer A | Acrylonitrile (AN) | 70 | 100 | 7.00:3.00 | 207 | ○○ | 4.6 | ○ | 91 | ○○ | 0 | ○ | 70 |
| | Monomer B | Acrylic acid (AA) | 30 | | | | | | | | | | | |
| Example 2 | Monomer A | Acrylonitrile (AN) | 50 | 100 | 5.00:5.00 | 224 | ○○ | 4.4 | ○ | 120 | ○○ | 0 | ○ | 50 |
| | Monomer B | Acrylic acid (AA) | 50 | | | | | | | | | | | |
| Example 3 | Monomer A | Acrylonitrile (AN) | 90 | 100 | 9.00:1.00 | 190 | ○ | 4.6 | ○ | 48 | ○ | 0 | ○ | 90 |
| | Monomer B | Acrylic acid (AA) | 10 | | | | | | | | | | | |
| Example 4 | Monomer A | Acrylamide (Am) | 70 | 100 | 7.00:3.00 | 204 | ○○ | 4.7 | ○ | 46 | ○ | 0 | ○ | 0 |
| | Monomer B | Acrylic acid (AA) | 30 | | | | | | | | | | | |
| Example 5 | Monomer A | Acrylamide (Am) | 70 | 100 | 7.00:3.00 | 191 | ○ | 5.1 | ○○ | 42 | ○ | 0 | ○ | 0 |
| | Monomer B | t-Butyl acrylate (tBA) | 30 | | | | | | | | | | | |
| Example 6 | Monomer A | Acrylonitrile (AN) | 70 | 100 | 7.00:3.00 | 195 | ○ | 5.1 | ○○ | 49 | ○ | 0 | ○ | 70 |
| | Monomer B | t-Butyl acrylate (tBA) | 30 | | | | | | | | | | | |
| Example 7 | Monomer A | Acrylonitrile (AN) | 60 | 100 | 6.00:4.00 | 212 | ○○ | 4.6 | ○ | 89 | ○○ | 0 | ○ | 60 |
| | Monomer B | Acrylic acid (AA) | 30 | | | | | | | | | | | |
| | | t-Butyl acrylate (tBA) | 10 | | | | | | | | | | | |
| Example 8 | Monomer A | Acrylonrtrile (AN) | 50 | 100 | 5.00:5.00 | 199 | ○ | 4.5 | ○ | 42 | ○ | 0 | ○ | 50 |
| | Monomer B | Acrylic acid (AA) | 20 | | | | | | | | | | | |
| | | Methyl acrylate (MA) | 30 | | | | | | | | | | | |
| Example 9 | Monomer A | Acrylonitrile (AN) | 60 | 100 | 6.00:4.00 | 198 | ○ | 4.6 | ○ | 42 | ○ | 0 | ○ | 60 |
| | Monomer B | Acrylic acid (AA) | 30 | | | | | | | | | | | |
| | | Methyl acrylate (MA) | 10 | | | | | | | | | | | |
| Example 10 | Monomer A | Acrylonrtrile (AN) | 50 | 100 | 7.00:3.00 | 212 | ○○ | 4.4 | ○ | 110 | ○○ | 0 | ○ | 50 |
| | | Acrylamide (Am) | 20 | | | | | | | | | | | |
| | Monomer B | Acrylic acid (AA) | 20 | | | | | | | | | | | |
| | | t-Butyl acrylate (tBA) | 10 | | | | | | | | | | | |

TABLE 2

| | Monomer | | Parts by weight | Total amount of A and B (% by weight) | A:B | Heat resistance Tmax (° C.) | Evaluation | Expansion ratio Expansion ratio (times) | Evaluation | Durability ΔT½ (° C.) | Evaluation | Shear strength ΔTs (° C.) | Evaluation | Nitrile ratio |
|---|---|---|---|---|---|---|---|---|---|---|---|---|---|---|
| Example 11 | Monomer A | Acrylonitrile (AN) | 80 | 100 | 8.00:2.00 | 202 | ○○ | 4.6 | ○ | 65 | ○○ | 0 | ○ | 80 |
| | Monomer B | Acrylic acid (AA) | 20 | | | | | | | | | | | |

TABLE 2-continued

| | Monomer | | Parts by weight | Total amount of A and B (% by weight) | A:B | Heat resistance Tmax (° C.) | Evaluation | Expansion ratio Expansion ratio (times) | Evaluation | Durability ΔT½ (° C.) | Evaluation | Shear strength ΔTs (° C.) | Evaluation | Nitrile ratio |
|---|---|---|---|---|---|---|---|---|---|---|---|---|---|---|
| | | Kind | | | | | | | | | | | | |
| Example 12 | Monomer A | Acrylonitrile (AN) | 70 | 90 | 7.78:2.22 | 218 | ○○ | 4.9 | ○ | 94 | ○○ | 0 | ○ | 80 |
| | Monomer B | Acrylic acid (AA) | 20 | | | | | | | | | | | |
| | Other Monomer | Methacrylonitrile (MAN) | 10 | | | | | | | | | | | |
| Example 13 | Monomer A | Acrylonitrile (AN) | 50 | 70 | 7.15:2.85 | 220 | ○○ | 4.9 | ○ | 115 | ○○ | 0 | ○ | 80 |
| | Monomer B | Acrylic acid (AA) | 20 | | | | | | | | | | | |
| | Other Monomer | Methacrylonitrile (MAN) | 30 | | | | | | | | | | | |
| Example 14 | Monomer A | Acrylonitrile (AN) | 50 | 80 | 6.25:3.75 | 223 | ○○ | 4.7 | ○ | 116 | ○○ | 0 | ○ | 70 |
| | Monomer B | Acrylic acid (AA) | 30 | | | | | | | | | | | |
| | Other Monomer | Methacrylonitrile (MAN) | 20 | | | | | | | | | | | |
| Example 15 | Monomer A | Acrylonitrile (AN) | 50 | 90 | 5.56:4.44 | 225 | ○○ | 4.4 | ○ | 118 | ○○ | 0 | ○ | 60 |
| | Monomer B | Acrylic acid (AA) | 40 | | | | | | | | | | | |
| | Other Monomer | Methacrylonitrile (MAN) | 10 | | | | | | | | | | | |
| Example 16 | Monomer A | Acrylonitrile (AN) | 80 | 90 | 8.89:1.11 | 215 | ○○ | 4.5 | ○ | 55 | ○○ | 0 | ○ | 90 |
| | Monomer B | Acrylic acid (AA) | 10 | | | | | | | | | | | |
| | Other Monomer | Methacrylonitrile (MAN) | 10 | | | | | | | | | | | |

TABLE 3

| | Monomer | | Parts by weight | Total amount of A and B (% by weight) | A:B | Heat resistance Tmax (° C.) | Evaluation | Expansion ratio Expansion ratio (times) | Evaluation | Durability ΔT½ (° C.) | Evaluation | Shear strength ΔTs (° C.) | Evaluation | Nitrile ratio |
|---|---|---|---|---|---|---|---|---|---|---|---|---|---|---|
| | | Kind | | | | | | | | | | | | |
| Comparative Example 1 | Monomer A | Acrylonitrile (AN) | 22.4 | 22.4 | 10.00:0.00 | 222 | ○○ | 2 | X | 16 | X | 0 | ○ | 44.8 |
| | Other monomer | Methacrylic acid (MAA) | 53.8 | | | | | | | | | | | |
| | Other monomer | Ethylene glycol dimethacrylate (EGDMA) | 1.3 | | | | | | | | | | | |
| | Other monomer | Methacrylonitrile (MAN) | 22.4 | | | | | | | | | | | |
| Comparative Example 2 | Monomer A | Acrylonitrile (AN) | 95 | 100 | 9.50:0.50 | 182 | X | 3.3 | Δ | 38 | Δ | 0 | ○ | 95 |
| | Monomer B | Acrylic acid (AA) | 5 | | | | | | | | | | | |
| Comparative Example 3 | Other monomer | Methacrylonitrile (MAN) | 44 | 0 | — | 225 | ○○ | 2.4 | X | 32 | Δ | 30 | X | 44 |
| | Other monomer | Methacrylic acid (MAA) | 56 | | | | | | | | | | | |
| Comparative Example 4 | Monomer A | Acrylonitrile (AN) | 60 | 60 | 10.00:0.00 | 178 | X | 42 | ○ | 24 | X | 0 | ○ | 100 |
| | Other monomer | Methacrylonitrile (MAN) | 40 | | | | | | | | | | | |
| Comparative | Other monomer | Methacrylic acid (MAA) | 50 | 50 | 0.00:10.00 | | | Not granulated | | | | | | 0 |

TABLE 3-continued

| | | | Parts by weight | Total amount of A and B (% by weight) | A:B | Heat resistance Tmax (°C.) | Evaluation | Expansion ratio (times) | Evaluation | Durability ΔT½ (°C.) | Evaluation | Shear strength ΔTs (°C.) | Evaluation | Nitrile ratio |
|---|---|---|---|---|---|---|---|---|---|---|---|---|---|---|
| | | Kind | | | | | | | | | | | | |
| Example 5 | Monomer B | Acrylic acid (AA) | 50 | | | | | | | | | | | |
| Comparative Example 6 | Monomer A | Acrylonrtrile (AN) | 90 | 90 | 10.00:0.00 | 156 | X | 1.8 | X | 16 | X | 0 | ○ | 90 |
| | Other monomer | Styrene | 10 | | | | | | | | | | | |
| Comparative Example 7 | Monomer A | Acrylonitrile (AN) | 61.5 | 100 | 9.02:0.98 | 205 | ○○ | 3 | Δ | 25 | X | 0 | ○ | 61.5 |
| | Monomer A | N,N-Dimethyl-acrylamide | 21.9 | | | | | | | | | | | |
| | Monomer A | N-Methylol-acrylamide | 6.8 | | | | | | | | | | | |
| | Monomer B | Acrylic acid (AA) | 9.8 | | | | | | | | | | | |
| Comparative Example 8 | Monomer A | Acrylonitrile (AN) | 45 | 100 | 4.50:5.50 | | | Not granulated | | | | | | 45 |
| | Monomer B | Acrylic acid (AA) | 55 | | | | | | | | | | | |
| Comparative Example 9 | Monomer A | Acrylonitrile (AN) | 30 | 50 | 6.00:4.00 | 175 | X | 4.3 | ○ | 25 | X | 0 | ○ | 80 |
| | Monomer B | Acrylic acid (AA) | 20 | | | | | | | | | | | |
| | Other monomer | Methacrylonitrile (MAN) | 50 | | | | | | | | | | | |

(Evaluation 2)

The foam molded articles obtained in the examples and comparative examples were each evaluated as follows. Table 4 shows the results. Here, no evaluations were carried out for Comparative Examples 5, 6, 8, and 9.

(1) Expansion Ratio of Foam Molded Article

The specific gravity (D0) of a thermoplastic elastomer (Hytrel #8752, DuPont) as a molding base and the specific gravity (D1) of each foam molded article were measured using an electronic gravimeter ("ED-120T", Mirage Trading Co., Ltd.). The expansion ratio of each foam molded article was calculated using the following equation (1):

$$\text{Expansion ratio (times)} = (D0/D1) \quad (1).$$

Evaluation was conducted based on the following criteria.
X: The expansion ratio was less than 1.5 times.
○: The expansion ratio was not less than 1.5 times and less than 2.0 times.
○○: The expansion ratio was not less than 2.0 times.

(2) Tactile Impression of Foam Molded Article

The durometer hardness was measured using a type A durometer in accordance with JIS-K-6253 and the tactile impression of each foam molded article was evaluated based on the following criteria.
X: The durometer hardness was more than 70%.
○: The durometer hardness was not more than 70% and more than 60%.
○○: The durometer hardness was not more than 60%.

(3) Damping Property of Foam Molded Article

The static rigidity and the static/dynamic ratio of each foam molded article were measured as follows and the damping property was evaluated. Smaller values of the static rigidity and the static/dynamic ratio indicate better damping properties of the foam molded article.

(3-1) Measurement of Static Rigidity

An indenter (stainless-steel, φ15 mm×10 mm cylinder shape) was placed on the surface of each obtained foam molded article, and the height thereof was marked as 0. A load of 91.5 N was applied to the indenter for 60 seconds and the displacement (S1) was measured using a static testing machine ("EZ Graph", Shimadzu Corporation). Then, a load of 320 N was applied to the indenter for 60 seconds and the displacement (S2) was measured. The static rigidity was calculated based on the following equation (2):

$$\text{Static rigidity (N/mm)} = (320 - 91.5)/(S2 - S1) \quad (2).$$

The evaluation criteria were as follows.
X: The static rigidity was more than 300 N/mm.
○: The static rigidity was not more than 300 N/mm and more than 250 N/mm.
○○: The static rigidity was not more than 250 N/mm.

(3-2) Measurement of Static/Dynamic Ratio

An indenter (stainless-steel, φ15 mm×10 mm cylinder shape) was placed on the surface of each obtained foam molded article, and the height thereof was marked as 0. Using a tensilon universal testing machine ("UTA-500", A&D Company Limited), a cyclic load of 91.5 N at the minimum and 320 N at the maximum was applied to the indenter (1000 cycles). The average values of the following items between the 900th cycle and the 1000th cycle were obtained:

Force (FU) applied and displacement (SU) of the indenter at the maximum pressure, and Force (FD) applied and displacement (SD) of the indenter at the minimum pressure.

Based on the obtained values, the dynamic rigidity was calculated using the following equation (3).

$$\text{Dynamic rigidity (N/mm)} = (FU - FD)/(SU - SD) \quad (3)$$

Moreover, based on the obtained dynamic rigidity and the static rigidity, the dynamic/static ratio was obtained using the following equation (4).

$$\text{Dynamic/static ratio (times)} = \text{dynamic rigidity/static rigidity} \quad (4)$$

The evaluation criteria were as follows.
X: The dynamic/static ratio was more than 1.5 times.
○: The dynamic/static ratio was not more than 1.5 times and more than 1.0 time.
○○: The dynamic/static ratio was not more than 1.0 time.

TABLE 4

| | Foam molded article | | | | | | | |
|---|---|---|---|---|---|---|---|---|
| | Expansion ratio | | Tactile impression | | Damping property | | | |
| | | | | | Static rigidity | | Dynamic/static ratio | |
| | Expansion ratio (times) | Evaluation | Durometer hardness (%) | Evaluation | Static rigidity (N/mm) | Evaluation | Dynamic/static ratio (times) | Evaluation |
| Example 1 | 1.82 | ○ | 58 | ○○ | 248 | ○○ | 1.28 | ○ |
| Example 2 | 1.85 | ○ | 61 | ○ | 249 | ○○ | 1.25 | ○ |
| Example 3 | 1.68 | ○ | 67 | ○ | 265 | ○ | 1.24 | ○ |
| Example 4 | 1.72 | ○ | 68 | ○ | 264 | ○ | 1.24 | ○ |
| Example 5 | 1.72 | ○ | 69 | ○ | 268 | ○ | 1.2 | ○ |
| Example 6 | 1.74 | ○ | 67 | ○ | 252 | ○ | 1.28 | ○ |
| Example 7 | 2.02 | ○○ | 57 | ○○ | 248 | ○○ | 1.36 | ○ |
| Example 8 | 1.74 | ○ | 69 | ○ | 259 | ○ | 1.28 | ○ |
| Example 9 | 1.75 | ○ | 69 | ○ | 257 | ○ | 1.28 | ○ |
| Example 10 | 1.97 | ○ | 57 | ○○ | 246 | ○○ | 1.34 | ○ |
| Example 11 | 1.78 | ○ | 61 | ○ | 249 | ○○ | 1.32 | ○ |
| Example 12 | 2.01 | ○○ | 58 | ○○ | 244 | ○○ | 1.36 | ○ |
| Example 13 | 2 | ○○ | 59 | ○○ | 248 | ○○ | 1.36 | ○ |
| Example 14 | 2 | ○○ | 58 | ○○ | 248 | ○○ | 1.34 | ○ |
| Example 15 | 1.84 | ○ | 62 | ○ | 252 | ○ | 1.32 | ○ |
| Example 16 | 1.78 | ○ | 65 | ○ | 262 | ○ | 1.29 | ○ |
| Comparative Example 1 | 1.47 | X | 76 | X | 356 | X | 1.04 | ○ |
| Comparative Example 2 | 1.52 | ○ | 72 | X | 305 | X | 1.18 | ○ |
| Comparative Example 3 | 1.76 | ○ | 71 | X | 302 | X | 1.16 | ○ |
| Comparative Example 4 | 1.72 | ○ | 68 | ○ | 312 | X | 1.18 | ○ |
| Comparative Example 7 | 1.47 | X | 74 | X | 326 | X | 1.05 | ○ |

INDUSTRIAL APPLICABILITY

The present invention provides a thermally expandable microcapsule that is excellent in the heat resistance and the durability and exhibits an excellent foaming property in a wide temperature range from low temperatures to high temperatures. The present invention also provides a method for producing the thermally expandable microcapsule, and a foamable masterbatch and a foam molded article which are produced from the thermally expandable microcapsule.

The invention claimed is:
1. A thermally expandable microcapsule,
which comprises a shell containing a copolymer, and a volatile liquid as a core agent included in the shell,
the copolymer being obtainable by polymerization of a monomer mixture containing a monomer A and a monomer B,
the monomer A being at least one selected from the group consisting of a nitrile group-containing acrylic monomer and an amide group-containing acrylic monomer,
the monomer B being t-butyl acrylate and acrylic acid,
a total amount of the monomer A and the monomer B accounting for 70% by weight or more of the monomer mixture, and
a weight ratio of the monomer A and the monomer B being 5:5 to 9:1,
the monomer B being 10% to 30% by weight of t-butyl acrylate and 10% to 30% by weight of acrylic acid, wherein the weigh percentages of t-butyl acrylate and acrylic acid are relative to the total weight of the monomer A and the monomer B.

2. The thermally expandable microcapsule according to claim 1,
wherein the nitrile group-containing acrylic monomer is acrylonitrile and the amide group-containing acrylic monomer is at least one selected from the group consisting of acrylamide, an N-substituted acrylamide, and an N,N-substituted acrylamide.

3. The thermally expandable microcapsule according to claim 2,
wherein the N-substituted acrylamide is at least one selected from the group consisting of N-isopropylacrylamide, N-methylolacrylamide, N-methoxymethyl acrylamide, N-ethoxymethyl acrylamide, N-propoxymethyl acrylamide, N-isopropoxymethyl acrylamide, N-butoxymethyl acrylamide, N-isobutoxymethyl acrylamide, diacetone acrylamide, and N,N-dimethylaminopropyl acrylamide, and the N,N-substituted acrylamide is at least one selected from the group consisting of N,N-dimethylacrylamide, N,N-diethylacrylamide, and acryloyl morpholine.

4. The thermally expandable microcapsule according to claim 1,
wherein the monomer A is acrylonitrile or acrylamide.

5. A method for producing the thermally expandable microcapsule according to claim 1, the method comprising the step of polymerizing a monomer mixture containing a monomer A and a monomer B, the monomer A being at least one selected from the group consisting of a nitrile group-containing acrylic monomer and an amide group-containing acrylic monomer, and the monomer B being t-butyl acrylate and acrylic acid.

6. A foamable masterbatch, which comprises the thermally expandable microcapsule according to claim 1, and a thermoplastic resin.

7. A foam molded article, which is obtainable by foam molding of a resin composition containing a thermoplastic resin and one of the thermally expandable microcapsule according to claim 1.

8. A foam molded article, which is obtainable by foam molding of a resin composition containing a thermoplastic resin and a foamable masterbatch according to claim 6.

* * * * *